Patented Nov. 12, 1946

2,411,029

UNITED STATES PATENT OFFICE 2,411,029

SUBRESINOUS POLYESTERS

Melvin De Groote, University City, and Bernhard Keiser, Webster Groves, Mo., assignors to Petrolite Corporation, Ltd., Wilmington, Del., a corporation of Delaware No Drawing. Original application March 3, 1943, Serial No. 478,597. Divided and this application September 2, 1943, Serial No. 501,031

6 Claims. (Cl. 260—404.8)

This invention relates to a new composition of matter, our present application being a division of our pending application Serial No. 478,597, Patent No. 2,385,970, filed March 3, 1943.

The main object of our invention is to provide a new material or composition of matter, that is particularly adapted for use as a demulsifier in the resolution of crude oil emulsions, but which is also adapted for use in other arts, as hereinafter indicated. For instance, the said material may be used as a break inducer in doctor treatment of the kind intended to sweeten gasoline. Certain of the compositions of matter herein described are of value as surface tension depressants in the acidification of calcareous oil-bearing strata by means of strong mineral acid, such as hydrochloric acid. Similarly, some members are effective as surface tension depressants, or wetting agents in the flooding of exhausted oil-bearing strata.

Another object of our invention is to provide a novel method for producing said new material or composition of matter.

The new material or composition of matter herein described, consists of a fractional ester, i. e., an ester containing at least one free carboxylic radical, and containing radicals, or groups derived from the following reactants:

(a) A polybasic carboxy acid;
(b) A high molal detergent-forming monocarboxy acid;
(c) A member of the class consisting of oxyalkylated polyhydric phenols, di(polyalkylene glycoxy) alkanes, in which the alkenyl radical is selected from the group consisting of the aliphatic alkenyl radicals containing from 8 to 18 carbon atoms; and the di-cyclohexenyl dialkyl methanes in which each alkyl radical contains preferably less than 10 carbon atoms; and
(d) A polyhydric alcohol radical as a linking radical wherever required.

Although the cycloaliphatic compounds, i. e., cycloalkanes, are not necessarily the obvious equivalent of the acyclic alkanes, we have found that no differentiation need be employed in respect to the compositions herein contemplated. The word "alkane," unless indicated otherwise, will be employed in its broadest aspect to include acyclic alkanes and cycloalkanes. The preparation of such hydroxylated bodies for subsequent reaction with phthalic anhydride or the like is well known. For convenience, reference is made to U. S. Patent No. 2,240,472, dated April 29, 1941, to Swan. The subject-matter following immediately is in essentially verbatim form, as it appears in said aforementioned Swan patent. Thus, one class of raw materials includes the di-(polyalkylene glycoxy) alkanes in which the alkenyl radical is selected from the group consisting of the aliphatic alkenyl radicals containing from 8 to 18 carbon atoms and the dicyclohexenyl dialkyl methanes, in which each alkyl radical contains less than 3 carbon atoms, each polyalkylene glycoxy chain contains from 5 to 20 alkylene glycol radicals, and the alkylene radical is selected from the group consisting of ethylene and propylene.

The di-(polyalkylene glycoxy) alkanes, in which the alkenyl radical is an aliphatic alkenyl radical of from 8 to 18 carbon atoms, e. g., di-(polyethylene glycoxy) decane

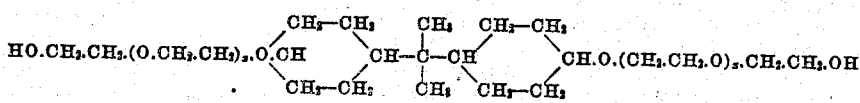

may be prepared in a manner similar to that shown in British Patent No. 443,559, by condensing ethylene oxide or propylene oxide with dihydric alcohols of from 8 to 18 carbon atoms, e. g., decamethylene glycol.

The di-(polyalkylene glycoxy) alkanes in which the alkenyl radical is a di-cyclohexenyl dialkyl methane, e. g., 4:4'-di-(polyethylene glycoxycyclohexyl) dimethyl methane

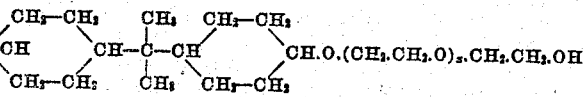

may be prepared as follows: Phenol is reacted with acetone (or diethyl ketone or methyl ethyl ketone), as described in U. S. Patent No. 1,225,748, of Wallace A. Beatty, to give the compound diphenylol dimethyl methane.

(or the corresponding diethyl or methyl ethyl compound). This compound is hydrogenated as described in British Patent No. 274,439, to give the corresponding dicyclohexylol dialkyl methane. This is then condensed with ethylene oxide or propylene oxide, in a manner similar to that shown in British Patent No. 443,559. Such compounds are mentioned in French Patent No. 772,302. It is to be noted, however, that the raw materials employed in the present instance for reaction with phthalic anhydride or the like, are not limited to those which are especially water-soluble but include those of lesser water-solubility than the type described in said Swan patent. For this reason, one is not limited to the use of ethylene oxide and propylene oxide as a reactant, but may employ other compounds having a reactive ethylene oxide ring.

As typical examples of applicable compounds may be mentioned glycerine epichlorhydrin, glycid alcohol, ethylene oxide, propylene oxide, butene-2-oxide butene-1-oxide, isobutylene oxide, butadiene oxide, butadiene dioxide, chloroprene oxide, isoprene oxide, decene oxide, styrene oxide, cyclohexylene oxide, cyclopentene oxide, etc. In actual use we have found that one can obtain the cycloalkane derivatives more cheaply and more readily than the acyclic derivatives. In other words, straight chain or branched chain dihydric alcohols containing from 8 to 18 carbon atoms or thereabouts, are comparatively expensive, whereas, certain phenol-ketone condensation products, known generically in the art as "bis-phenols" are readily available and are comparatively inexpensive. As to the manufacture of bis-phenols, reference is made to U. S. Patent No. 2,182,308, dated December 5, 1939, to Britton and Bryner. Bis-phenols have the general formula:

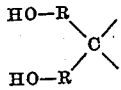

wherein R is an aryl group and the free bonds are linked with alkyl groups or an alkylene radical. They are commonly prepared by reacting a phenol, e. g., phenol, o-cresol, etc., with a ketone such as acetone, methyl-ethyl-ketone, dibenzyl ketone, cyclohexanone, etc., in the presence of a concentrated strong mineral acid such as sulfuric or hydrochloric acid. Any ketone, e. g., acetone, methyl ethyl ketone, diethyl ketone, dibutyl ketone, cyclohexanone, may be employed in the reaction and also a variety of phenols can be used; for instance, phenol, o-cresol, o-chlorphenol, etc., are suitable.

Similar reagents are derivable from a variety of other carbonyl-containing compounds, including ketones, in which the carbonyl oxygen is activated by the presence of a halogen as a substituent for a hydrogen atom, alpha-chlorinated aldehydes, etc. In the art relating to this type of compound they are sometimes described as "substituted methanes"; other times as "substituted 2,2 propanes." Although there is extensive literature dealing with this type of compound, reference is made only to a few additional patents, to wit: British Patent No. 274,439, to Chemische Fabrick Auf Actien; to British Patent No. 254,753, referred to previously, and British Patent No. 443,559 to I. G. Farbenindustrie, A. G. Alcohols obtained from ricinoleic acid, hydroxylated ricinoleic acid, etc., in which the two hydroxyl radicals are separated by at least 8 carbon atoms, are also satisfactory as reactants of the acyclic type. It is to be noted that such glycols are treated with oxyalkylating agents in the manner described in the treatment of cetyl alcohol, in Example 1 of the aforementioned British Patent No. 443,559.

Although it is not believed that a further description is required in respect to glycols or hydroxylated compounds employed as reactants, the following may be included by way of illustration: It may be well to emphasize that when glycid or the equivalent is employed, either alone or in combination with ethylene oxide, one may obtain a reactant which contains more than two alcoholic hydroxyls, and thus, in the strictest sense of the word, is not a glycol, but is conveniently included in the present instance and is contemplated within the scope of the hereto attached claims.

HYDROPHILE HYDROXYLATED ALKANES

Example 1

1 pound mole of decamethylene glycol is condensed with 6 moles of ethylene oxide.

HYDROPHILE HYDROXYLATED ALKANES

Example 2

The same procedure is followed, except that 12 moles of ethylene oxide are employed.

HYDROPHILE HYDROXYLATED ALKANES

Example 3

The same procedure is followed, except that 18 moles of ethylene oxide are employed.

HYDROPHILE HYDROXYLATED ALKANES

Example 4

The same procedure is followed, except that 24 moles of ethylene oxide are employed.

HYDROPHILE HYDROXYLATED ALKANES

Example 5

The same procedure is followed as in Examples 1 to 4, preceding, except that ricinoleyl alcohol di(hydroxy)octadecene is substituted for decamethylene glycol, in the preceding examples.

HYDROPHILE HYDROXYLATED ALKANES

Example 6

The alcohol derived from hydrogenated castor oil, a hydroxystearic acid glyceride, and sometimes referred to as di(hydroxy)octadecane, is substituted for decamethylene glycol, in the preceding Examples 1 to 4.

HYDROPHILE HYDROXYLATED ALKANES

Example 7

Di-cyclohexylol propane is prepared in the customary manner by the hydrogenation of dimethyl diphenylol methane. This product is sold commercially as Bis Phenol-A. The compound is also known as p,p'-dihydroxy diphenyl dimethyl methane, or as p,p'-isopropylidene bis-phenol, and has the following composition:

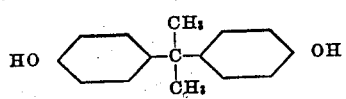

Needless to say, the same procedure for producing glycol or polyglycol ethers of polyhydric alcohols applies with equal force and effect to the polyhydric phenols. The manufacture of these compounds is well known, and for a complete description see British Patent No. 470,181, to I. G. Farbenindustrie, A. G. Attention is called particularly to certain suitable phenolic raw materials mentioned in said aforementioned British patent. Such polyhydric phenols include isononyl resorcinols. Note, particularly, Example 14 of said British patent, which is concerned with oxyethylated iso-octyl resorcinol. Due to its availability, we particularly prefer compounds obtained by treating 4-tert-butyl catechol (4-tert butyl-1,2-dihydroxy-benzene) with low molal alkylating agents, such as ethylene oxide, propylene oxide, butylene oxide, glycid, etc.

Furthermore, it is obvious that any of the phenol-ketone condensation products, or similar monomeric phenol-aldehyde condensation products of the kind previously described, may be employed. We particularly prefer to use any of the "bis-phenols" described generically in the aforementioned Britton and Bryner Patent No. 2,182,308, dated December 5, 1939.

HYDROPHILE HYDROXYLATED POLYHYDRIC PHENOLS

*Example 1*

1 pound mole of mixed isononyl resorcinols is treated with 6 moles of ethylene oxide. (See aforementioned British Patent No. 470,181.)

HYDROPHILE HYDROXYLATED POLYHYDRIC PHENOLS

*Example 2*

1 pound mole of iso-octyl resorcinol is treated with 6 moles of ethylene oxide. (Example 14 of aforementioned British Patent No. 470,181.)

HYDROPHILE HYDROXYLATED POLYHYDRIC PHENOLS

*Example 3*

1 pound mole of 4-tert-butyl catechol is treated with 6 moles of ethylene oxide.

HYDROPHILE HYDROXYLATED POLYHYDRIC PHENOLS

*Example 4*

1 pound mole of (dihydroxy phenyl)-dimethylmethane is treated with 6 moles of ethylene oxide.

HYDROPHILE HYDROXYLATED POLYHYDRIC PHENOLS

*Example 5*

1 pound mole of di(4-hydroxy toluyl)-dimethyl-methane, obtained from acetone and ortho cresol instead of acetone and phenol, is treated with 6 pound moles of ethylene oxide.

HYDROPHILE HYDROXYLATED POLYHYDRIC PHENOLS

*Example 6*

The same procedure is followed as in Examples 1 to 5, preceding, except that 12 moles of ethylene oxide are employed instead of 6 moles.

HYDROPHILE HYDROXYLATED POLYHYDRIC PHENOLS

*Example 7*

The same procedure is followed as in Examples 1 to 5, preceding, except that 18 moles of ethylene oxide instead of 6 moles of ethylene oxide are employed.

HYDROPHILE HYDROXYLATED POLYHYDRIC PHENOLS

*Example 8*

The same procedure is followed as in Examples 1 to 7, preceding, except that propyleneoxide, butylene oxide, or glycid is substituted for ethylene oxide.

A variety of polybasic carboxy acids, or their equivalents, such as the anhydrides, esters, or acyl chlorides, may be employed. Among various available polybasic carboxy acids suitable for use as reactants, are citric acid, tartaric acid, oxalic acid, phthalic acid, maleic acid, malic acid, succinic acid, adipic acid, azaleic acid, fumaric acid, citraconic acid, etc. We particularly prefer to use the dibasic acids. It is to be noted that numerous examples are available as anhydrides, rather than acid. Reference is made specifically to phthalic anhydride, maleic anhydride, citraconic anhydride, etc.

The detergent-forming monocarboxy acids containing at least 8 and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc. Acids obtained by the oxidation of petroleum fractions or waxes may be employed. This type of acid may also be subjected to various modifications, provided such modifications still retain detergent-forming properties.

A description of polyhydric alcohols is not necessary, since they represent a common class of chemical compounds. It is to be noted, however, that polyhydric alcohols are understood to include the ether type, such as diethylene glycol, triethylene glycol, tetraethlylene glycol, etc., as well as cyclic and acyclic polyglycerols, including di-glycerol, tri-glycerol, etc. Common examples include glycerol ethylene glycol, propylene glycol, etc.

In contemplating suitable procedure for forming the acidic esters herein contemplated, it is to be noted that a detergent-forming monocarboxy acid radical must be present. Such detergent-forming monocarboxy acid compound may or may not have a hydroxyl radical present. For instance, ricinoleic acid, hydroxystearic acid, dihydroxystearic acid, and the like, would have an alcoholic hydroxyl group present as part of the higher fatty acid acyl radical. This would not be true if oleic acid, stearic acid, linoleic acid, naphthenic acid, or the like, were employed. On the other hand, one could employ mono-olein, di-olein, monostearin, di-stearin, mono-naphthenin, di-naphthenin, etc. Likewise, one may employ a material, such as mono-ricinolein, di-ricinolein, and the like. Furthermore, in addition to employing such materials as ricinoleic acid, one may employ ethyl ricinoleate, ethylene glycol ricinoleate, tri-ricinoleate, etc.

Having prepared the polygylcol ethers of various polyhydroxylated alkanes and polyhydric phenols, as previously described, a convenient second step in the preparation of the new composition of matter is to produce acid esters of the kind obtainable between polybasic carboxy acids, or their functional equivalents, such as the anhydrides, and hydroxylated fatty acids, esters, or the like.

Reference is made to the following examples which are indicated by structural formulas and described in detail in U. S. Patent No. 2,166,432, dated July 18, 1939, to De Groote:

[Chemical structure diagrams showing:

benzene ring with —COOH, —COO.R.COO.CH₂, OH.R.COO.CH, OH.R.COO.CH₂ benzene ring with —COOH, —COO.R.COO.CH₂, HO.R.COO.CH, —COO.R.COO.CH₂, —COOH benzene ring with —COOH, —COO.R.COO.CH₂; HOOC—benzene—COO.R.COO.CH; benzene with —COO.R.COO.CH₂, —COOH benzene ring with —COOH, —COO.R.COO.CH₂, COO.R.COO.CH, (and) benzene-COO.R.COO.CH₂]

Furthermore, note additional examples described in detail in U. S. Patent No. 2,166,433, dated July 18, 1939, to De Groote. Among the various examples are the following:

[Chemical structure diagrams showing:

R.COO.C₃H₅ with OOC—benzene—COOH and OH

R.COO.C₃H₅ with OOC—benzene—COOH and OOC—benzene—COOH (R.COO)₂C₃H₄OOC—benzene—COOH OH.R.COO.C₃H₅ with OOC—benzene—COOH and OH OH.R.COO.C₃H₅ with OOC—benzene—COOH and OOC—benzene—COOH]

The previous examples exemplifying certain polycarboxylic reactants have been limited to the type in which phthalic anhydride was employed. Previously attention has been directed to the fact that numerous other polybasic acids or anhydrides, particularly maleic anhydrides, adipic acid, citraconic acid, azaleic acid, sebacic acid, succinic acid, etc., might be employed just as advantageously.

POLYBASIC REACTANTS
Example 1

Polyphthalated triricinolein is prepared in the manner described in U. S. Patent No. 1,976,602, dated October 9, 1934, to De Groote et al. (See page 4, lines 15 et seq.)

POLYBASIC REACTANTS
Example 2

Commercial diricinolein is treated with two moles of phthalic anhydride, so as to yield an ester having two free carboxyl radicals. This is a conventional esterification reaction, and the materials are intimately mixed and heated at approximately 120–160° C., with constant agitation, until samples taken from the batch and analyzed show substantially complete reaction. A suitable solvent may be present, and water formed may be distilled off continuously during the esterification process. The solvent may remain behind in the final product, or be removed, if desired.

POLYBASIC REACTANTS
Example 3

Diphthalated mono-olein is prepared in a manner similar to the procedure employed in preparing diphthalated diricinolein in Example 2, immediately preceding.

POLYBASIC REACTANTS
Example 4

Dimaleated monostearin is prepared in a manner similar to that employed in the preceding examples.

POLYBASIC REACTANTS
Example 5

Dioxalated monoabietin is prepared in a manner similar to that employed in the preceding examples.

POLYBASIC REACTANTS
Example 6

Dicitrated mononaphthenin is prepared in a manner similar to that employed in the preceding examples.

POLYBASIC REACTANTS
Example 7

1 mole of ricinoleic acid is reacted with one mole of phthalic anhydride.

POLYBASIC REACTANTS
Example 8

1 mole of butyl ricinoleate is reacted with 1 mole of phthalic anhydride.

FINAL COMPOSITION OF MATTER
Example 1

1 pound mole of a hydroxylated alkane, such as exemplified by Hydrophile Hydroxylated Alkanes, Examples 1 to 7, inclusive, is reacted with 1 mole of diphthalated triricinolein, so as to give a sub-resinous material in which there is present at least one unreacted carboxyl radical. The diphthalated triricinolein is, in turn, obtained by reaction between 1 mole of triricinolein and two moles of phthalic anhydride in the manner previously described. The esterification reactions are conducted in the usual manner (see, for example, U. S. Patent No. 2,166,433, aforementioned, page 6, right hand column, line 33).

FINAL COMPOSITION OF MATTER

Example 2

A hydrophile hydroxylated polyhydric phenol, as exemplified by Hydrophile Hydroxylated Polyhydric Phenols, Examples 1 to 8, inclusive, are substituted for the hydrophile hydroxylated alkanes employed in the preceding example.

FINAL COMPOSITION OF MATTER

Example 3

The same procedure is followed as in Examples 1 and 2, preceding, except that materials of the kind exemplified by Polybasic Reactants, Examples 2 to 6, inclusive, are substituted for polyphthalated triricinolein.

FINAL COMPOSITION OF MATTER

Example 4

The same procedure is followed as in the previous examples, except that Polybasic Reactants, Example 7 or 8, are employed, followed by subsequent reaction with an additional mole of phthalic anhydride, or some other polybasic acid.

Attention is directed to what is perfectly obvious, in view of what has been said previously, that an alternate method of obtaining the preceding examples or kindred types, employs reacting a polyglycol ether with the polybasic acid, and then adding a selected detergent-forming material, such as ricinoleic acid, methyl ricinoleate, triricinolein, mono-olein, or the like. Similarly, a somewhat different type is avalable by esterifying the polyglycol ether with the detergent-forming acid, and then reacting with the polybasic acid. Obviously, if all of the hydroxyls of the polyglycol ether are esterified with a detergent-forming monocarboxy acid, then at least one such high molal acyl radicals must contain a hydroxyl group. In other words, one should employ a material of the type exemplified by ricinoleic acid, hydroxystearic acid, or the like. This then permits subsequent reaction with a polybasic acid, such as phthalic anhydride, or the like. If, however, the polyglycol ether is esterified with oleic acid, naphthenic acid, oxidized petroleum acid, or abietic acid, then at least, one unreacted hydroxyl group must be available for subsequent reaction with phthalic anhydride, or the like. In this connection, attention is directed particularly to completion of the oxyalkylation reaction by means of glycid. For instance, where previous directions have called for the use of 6 moles, or 12 moles, or 18 moles of ethylene oxide, it would be desirable to use somewhat less. For instance, 4 moles, or 10 moles, or 16 moles, and then complete the oxyethylation by means of 2 moles of glycid.

We have found that the most suitable products for various purposes, and particularly, for demulsification, are sub-resinous, semi-resinous, or balsam-like products, and are preferably derived from polyfunctional acylated reactants, in which the acyl group is derived from a high molal detergent-forming monocarboxy acid. We have found that such products are soluble to a fairly definite state, for example, 5% in some solvent, such as water, alcohol, benzene, dichloroethyl ether, acetone, cresylic acid, dilute acidic acid, dioxane, or the like. This is simply another way of stating that it is preferable, that the product be one of the sub-resins, which are commonly referred to as an A resin, or a B resin, as distinguished from a C resin, which is a highly infusible, insoluble resin. (See Ellis, Chemistry of Synthetic Resins, 1935, page 862, et seq.)

The hydroxylated products or acylated hydroxylated products, or the like, may be considered as an alcohol, i. e., a monohydric or polyhydric alcohol. If an alcohol is indicated by the formula $Y'(OH)_n$, where $n$ indicates the number 1, or more, and if a polybasic acid body be indicated by the formula $X'(COOH)_n$, where $n$ indicates the number 2, or more, then the reaction between a monohydric alcohol and a polybasic acid will result in a compound which may be indicated by the following formula: $YX(COOH)_{n'}$, where $n'$ indicates the number 1, or more, and which is in reality a contraction of a more elaborate structural formula, in which X' and Y' are joined by a carboxyl radical or residue. Assuming, however, as would be true in the majority of cases, that the alcohol actually would be a polyhydric alcohol, and that the acid body would be polybasic in nature, for instance, if one employed a diphthalate of a polyhydroxylated ether or the like of the kind previously described, then examination reveals that the formula might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals, or compounds where there might be residual carboxyl radicals and no residual hydroxyl radicals; or there might be both. This is indicated by the following:

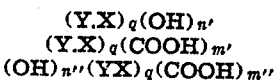

in which $q$ indicates a small whole number (one in the case of a monomer, and probably not over 10, and usually less than 5, and $m'$ and $n'$ indicate the number 1 or more, and $m''$ and $n''$ indicate zero or a small or moderately sized whole number, such as zero, one, or more, but in any event, probably a number not in excess of 4–8.

The words "acidyl" and "acyl" and the words "acidylation" and "acylation" are usually used synonymously. Compounds of the type herein contemplated, and particularly for use as demulsifiers, are characterized by having two different types of carboxylic acid radicals, or carboxylic acyl radicals present. One type is derived from high molal detergent-forming monocarboxy acids, such as higher fatty acids, and the other type is derived from polybasic acids, particularly phthalic acid, and the like, or other suitable derivatives thereof, such as diethyl phthalate. For purpose of clarity, in the hereto attached claims, the use of the words "acyl," "acylated" and "acylation" is limited to high molal monocarboxy detergent-forming acids, whereas, the expressions "acidyl," "acidylated" and "acidylation" are used in connection with polybasic carboxy acids.

Having thus described our invention, what we claim and desire to secure by Letters Patent is:

1. Sub-resinous polyesters having at least one free carboxyl radical, in which the radical derived from the alcohol of said sub-resinous polyester is that of a di-(polyalkylene glycoxy) alkane in which the ankenyl radical is selected from the group consisting of the aliphatic alkenyl radicals containing from 8 to 18 carbon atoms and the dicyclohexenyl dialkyl methanes in which each alkyl radical contains less than 3 carbon atoms, each polyalkylene glycoxy chain contains from 5 to 20 alkylene glycol radicals, and the alkylene radical is selected from the group consisting of ethylene and propylene, and the polycarboxy acid radical of said sub-resinous polyester is that of a polycarboxy acidic fractional ester of a ricinoleic acid glyceride and has a plurality of free carboxyl radicals.

2. The sub-resinous ester, as defined in claim 1, with the proviso that all polycarboxy acid radicals be dibasic.

3. The sub-resinous ester, as defined in claim 1, with the proviso that all polycarboxy acid radicals be dibasic and the ricinoleic acid glyceride be triricinolein.

4. The sub-resinous ester, as defined in claim 1, with the proviso that all polycarboxy acid radicals be phthalic acid radicals and the ricinoleic acid glyceride be triricinolein.

5. The sub-resinous ester, as defined in claim 1, with the proviso that all polycarboxy acid radicals be maleic acid radicals and the ricinoleic acid glyceride be triricinolein.

6. The sub-resinous ester, as defined in claim 1, with the proviso that all polycarboxy acid radicals be adipic acid radicals and the ricinoleic acid glyceride be triricinolein.

MELVIN DE GROOTE.
BERNHARD KEISER.